(12) United States Patent
Shahar (10) Patent No.: US 8,948,064 B2
(45) Date of Patent: *Feb. 3, 2015

(54) METHOD AND APPARATUS FOR LONG RANGE PRIVATE BROADBAND WIRELESS COMMUNICATION SYSTEM

(75) Inventor: Menashe Shahar, Los Altos, CA (US)

(73) Assignee: Full Spectrum Inc., Palo Alto, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 12/939,186

(22) Filed: Nov. 4, 2010

(65) Prior Publication Data

US 2011/0044231 A1 Feb. 24, 2011

Related U.S. Application Data

(63) Continuation-in-part of application No. 12/426,697, filed on Apr. 20, 2009, now Pat. No. 8,098,604.

(51) Int. Cl.
| | |
|---|---|
| *H04W 40/00* | (2009.01) |
| *H04L 5/00* | (2006.01) |
| *H04W 84/04* | (2009.01) |
| *H04W 4/06* | (2009.01) |
| *H04W 88/00* | (2009.01) |

(52) U.S. Cl.
CPC ........... *H04L 5/0037* (2013.01); *H04W 84/042* (2013.01); *H04W 4/06* (2013.01); *H04W 88/00* (2013.01)
USPC ........................................................ 370/278

(58) Field of Classification Search
CPC . H04L 5/14; H04L 2012/5608; H04W 84/18; H04W 84/12; H04B 7/2045
USPC ........................................ 370/277, 278, 310
See application file for complete search history.

(56) References Cited

U.S. PATENT DOCUMENTS

| | | | | |
|---|---|---|---|---|
| 5,371,736 | A * | 12/1994 | Evan ............................. | 370/470 |
| 7,787,431 | B2 * | 8/2010 | Li et al. ........................ | 370/343 |
| 2004/0203981 | A1 * | 10/2004 | Budka et al. ................. | 455/522 |
| 2005/0010958 | A1 * | 1/2005 | Rakib et al. .................. | 725/111 |
| 2006/0092865 | A1 * | 5/2006 | Williams ...................... | 370/310 |
| 2007/0104129 | A1 * | 5/2007 | Yang et al. ................... | 370/329 |
| 2007/0211719 | A1 * | 9/2007 | Johnson et al. .............. | 370/389 |
| 2008/0220788 | A1 * | 9/2008 | Stanwood et al. ............ | 455/450 |
| 2008/0273622 | A1 * | 11/2008 | Bergholm et al. ............ | 375/285 |
| 2009/0073932 | A1 * | 3/2009 | McBeath et al. ............. | 370/330 |

(Continued)

OTHER PUBLICATIONS

Moletrouser, Band , Mar. 28, 2009.*

*Primary Examiner* — Andrew Lai
*Assistant Examiner* — Zhiren Qin
(74) *Attorney, Agent, or Firm* — Henry M. Sinai; IP-Partnership (57) ABSTRACT

A method and apparatus for long range private broadband wireless communication system is provided. The communication system provides bi-directional Point-to-Multipoint (PtMP) data communication between a Network Operating Center (NOC) and many Subscriber Stations (SS) which may be either Mobile Stations (MS) or Fixed Stations (FS) or both. The system infrastructure consists of Base Stations (BSs) which may be located at the PLMR tower sites and backhaul communication infrastructure connecting the BSs to the Network Operating Center (NOC). The system infrastructure at the NOC includes a central router, a Network Management System (NMS) server, a DHCP server, a TOD server, an AAA server and may also include a Base Station Controller (BSC).

30 Claims, 7 Drawing Sheets

(56) References Cited

U.S. PATENT DOCUMENTS

| | | |
|---|---|---|
| 2009/0201860 A1* | 8/2009 | Sherman et al. ............. 370/329 |
| 2009/0233544 A1* | 9/2009 | Oyman et al. .................... 455/7 |
| 2009/0247148 A1* | 10/2009 | Chen et al. ................. 455/422.1 |
| 2010/0260137 A1* | 10/2010 | Vrzic et al. ................... 370/330 |
| 2011/0019567 A1* | 1/2011 | Jiao et al. ...................... 370/252 |

* cited by examiner

| PHY LAYER 40 | MAC LAYER 42 | COMPLEMENTARY EMBEDDED SW |
|---|---|---|
| BS PHY LAYER INNOVATIVE CAPABILITIES | BS MAC LAYER INNOVATIVE CAPABILITIES | NETWORKING, SNMP AGENT ETC. |
| Ieee802.16-e COMPLIANT BS PHY LAYER SOFTWARE | Ieee802.16-e COMPLIANT BS MAC LAYER SOFTWARE | |
| BASIC SOFTWARE INFRASTRUCTURE | OPERATING SYSTEM | |
| EMBEDDED SIGNAL PROCESSOR | EMBEDDED GENERAL PURPOSE PROCESSOR | |

METHOD AND APPARATUS FOR LONG RANGE PRIVATE BROADBAND WIRELESS COMMUNICATION SYSTEM

CROSS-REFERENCE TO RELATED APPLICATIONS

This application is a continuation in part application of U.S. application Ser. No. 12/426,697; filed Apr. 20, 2009 now U.S. Pat. No. 8,098,604.

FIELD OF THE INVENTION

The present invention relates to the delivery of high speed data services in mission critical, private broadband wireless networks.

BACKGROUND OF THE INVENTION

Mission critical industries (e.g., electrical utilities, oil and gas industries etc.) have assets deployed in remote areas often not well covered by public wire line and wireless telecommunication networks. Moreover, even when public telecommunication services are available, mission critical industries are reluctant to use these services and prefer to operate their own private wireless networks. These networks typically have got their own towers with a serving area that extends up to 20 miles radius.

Traditionally, mission critical industries have built and operated voice centric Private Land Mobile Radio (PLMR) systems making it difficult to support emerging mission critical mobile and fixed data applications such as remote data base access, for example. These systems have several drawbacks, as follows:

Communication in PLMR systems is done over narrowband PLMR channels. A PLMR channel width of 25 KHz is typically being used, but the FCC regulations have mandated the narrow banding of certain frequencies, reducing channel sizes from 25 KHz to 12.5 KHz in order to double the number of available PLMR channels. The FCC is considering a further decrease in PLMR channel width to 6.25 KHz. As a result, while PLMR channels can support excellent voice quality, data communication is very slow.

Most PLMR systems are circuit switched systems. As such, they are not efficient for data communication. Research with real customer data reveals that channel voice occupancy is typically very low.

Several solutions are currently used by mission critical industries to deliver data services:

Public wireless networks: These networks typically lack coverage across the PLMR user's serving area. Public wireless networks have two additional challenges with respect to serving mission critical industries.

Given their commitment to serve the general public, they cannot prioritize, mission critical customers over general public customers. The bandwidth available to the mission critical customer will therefore depend on the general public usage. As a result, these systems are not considered mission critical by the mission critical customers.

The mission critical applications are very different from the general public typically requiring a different network design. For example, a major mission critical application is Supervisory Control and Data Acquisition (SCADA) which requires a reverse asymmetrical network (i.e., more capacity in the uplink than in the downlink) and network design that will meet tight latency requirements.

Dedicated data networks operating in unlicensed bands (900 MHz, 2.4 GHz or 5.8 GHz). These networks provide very poor coverage due to transmit power restrictions in the unlicensed bands as per FCC Part 15. In addition these systems suffer from poor receiver sensitivity due to a high noise floor generated by other users and the wide channels used (e.g., >20 MHz wide channels for WiFi based systems). The inadequate propagation because of the relatively high frequencies. (Relative to the PLMR operating frequencies). The coverage of these systems can be improved only with a costly dense node deployment. In addition, these systems are not considered robust enough for mission critical applications and are limited in their support of mobility.

Dedicated data networks operating in a nationwide licensed band (e.g. 700 MHz). This solution does supports mission critical high speed data but is very costly given that:

It is highly desirable to have an operational licensed frequency below 1 GHz which will enable the delivery of mobile broadband data services over the existing PLMR tower serving area of up to 20 miles, to avoid the need to build new towers. The cost of licensing the frequencies is very high, especially if the customer is locked to a single frequency holder.

Only few licensed frequency opportunities are available countywide while many different licensed frequency opportunities are available in limited geographies. This implies that if the equipment is designed to operate in a specific frequency, it may not have the economy of scale that is needed to bring the cost down to an acceptable level.

There is thus a need to provide an innovative wireless system and methods to implement a mission critical high speed data solution with similar coverage to the existing PLMR voice service, which overcome the technical disadvantages of present systems.

SUMMARY OF THE INVENTION

A wireless communication system that provides bi-directional Point-to-Multipoint (PtMP) data communication between a Network Operating Center (NOC) and many Subscriber Stations (SS) which may be either Mobile Stations (MS) or Fixed Stations (FS) or both.

The system infrastructure consists of Base Stations (BSs) which may be located at the PLMR tower sites and backhaul communication infrastructure connecting the BSs to the Network Operating Center (NOC). The system infrastructure at the NOC includes a central router, a Network Management System (NMS) server, a DHCP server, a TOD server, an AAA server and may also include a Base Station Controller (BSC).

In one embodiment of the present invention, the system infrastructure also includes a router in each antenna tower.

An aspect of the invention is that the said system operates over a very long range relative to other terrestrial broadband wireless systems.

Another aspect is that the said system operates over a very wide frequency range.

Another aspect is that the said system operates over a range of channel bandwidths.

Yet another aspect of the invention employs Time Division Duplex (TDD) and Half Duplex FDD (H-FDD).

In one preferred embodiment of the invention, the system employs the existing PLMR tower and backhaul infrastructure to maintain coverage across the serving area (same as voice).

In a preferred embodiment of the invention, the system employs a modified version of the ieee802.16e-2005 standard for the air interface protocol.

The system supports a wide range of channel and subchannel frequency reuse schemes.

The system is designed to deliver high throughput and maintain broadband communication experience when operating in narrow channels.

The system is designed to support mission critical and smart grid applications.

The Base Station and the Subscriber Station are designed in Software Definable Radio (SDR) architecture.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
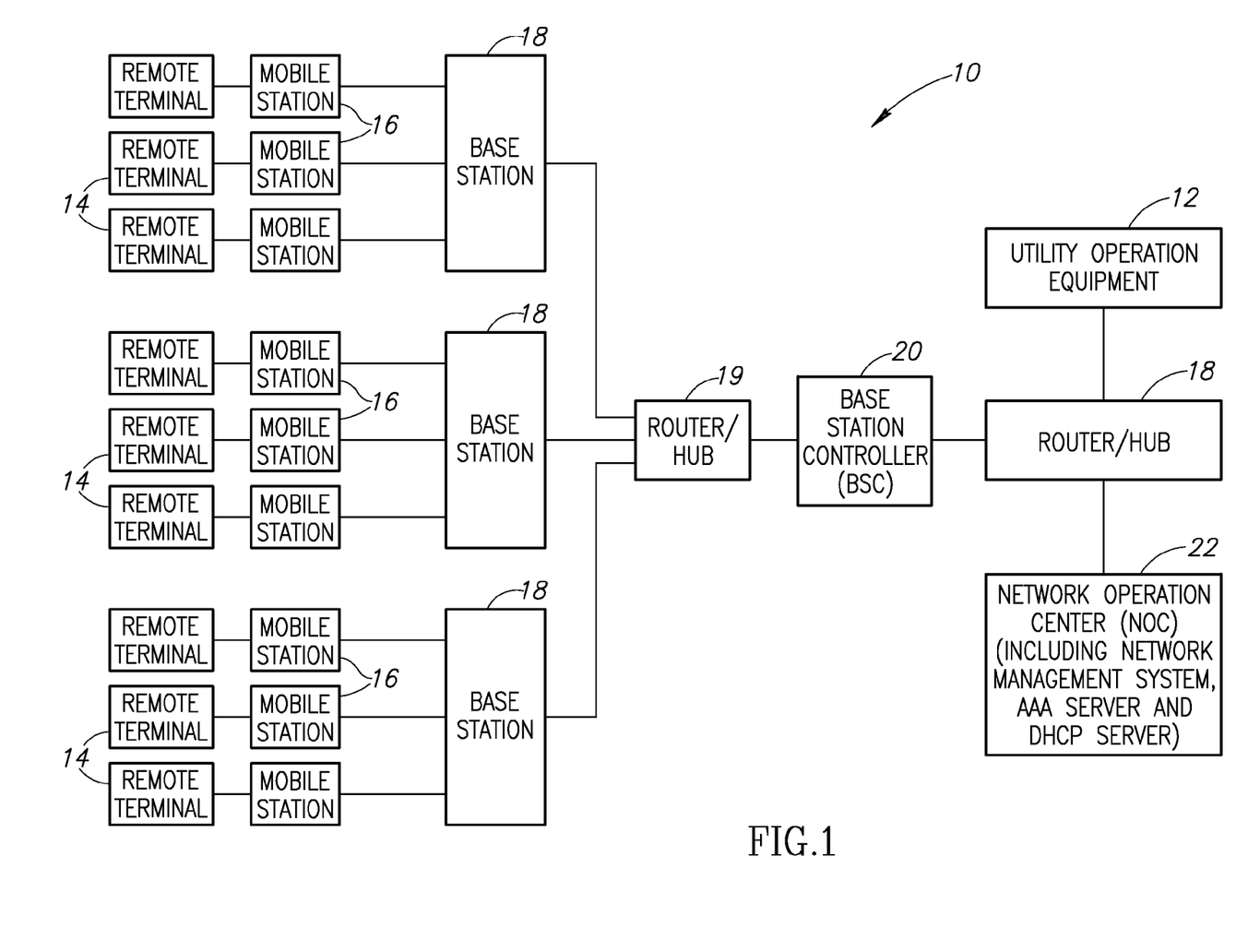
FIG. 1 is a schematic illustration of a PtMP wireless system operating over licensed and unlicensed bands with Base Station Controller (BSC), Base Stations (BSs), Mobile and Fixed Stations (SSs) and Remote Terminal (RTs)

FIG. 1 illustrates an exemplary environment where IEEE802.16-e based, PtMP wireless system, generally designated 10, operating over licensed & unlicensed bands according to an embodiment of the present invention.

The system communicates between Utility Operation Equipment 12 and a plurality of Remote Terminals (RTs) 14, which may be connected to Mobile Stations (MS)/Fixed Stations (FS) 16. The system implements the transmission method of the present invention described herein below, for communicating between the BSs 18 and the MSs/FSs 16. The Utility Operation Equipment 12 has a data connection (via a Router/hub 18) to the optional Base Station Controller (BSC) 20. The BSC 20 serves as the system's central data hub and controller.

The BSC 20 implements the functionality of an ASN Gateway as defined in the WiMAX standard. The main functionality of the BSC is to manage a location register from the Mobile Station which is used to route the traffic (via router 19) received from the Utility Operation Equipment to the appropriate Base Station depending on the location of the Mobile Station. The BSC also supports roaming of Mobile Stations from one BS to the other.

Figure 2:
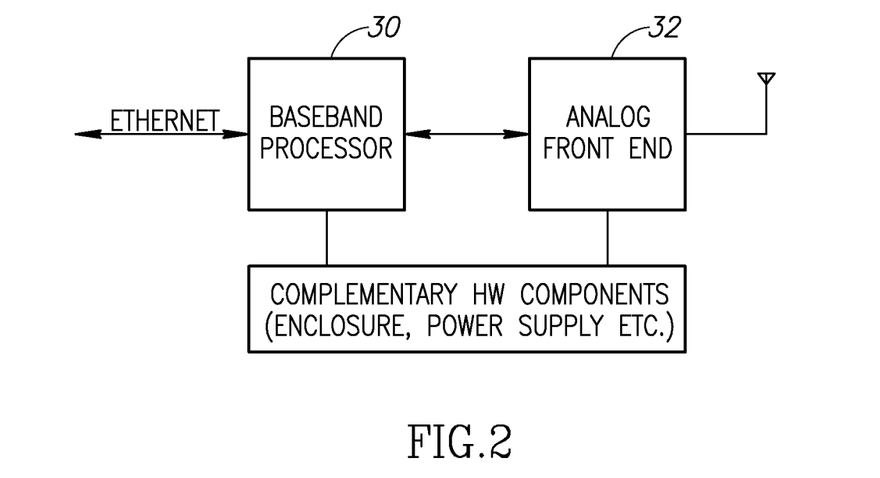
FIG. 2 is a schematic illustration of the Base Station (BS) and Mobile and Fix Station (SS) hardware architecture, used with the system of FIG. 1.

The Base Station Controller (BSC) 20 may be located at the Network Operation 20 Center (NOC) 22. The Network Operation Center (NOC) 22 may comprise a Network Management System (NMS), DHCP server and AAA server. The BSC 20 is in communication with multiple Base Stations 18 located at tower sites (Only three BSs are shown in FIG. 2, for clarity but it will be appreciated that the system may have a much larger number of BSs). The Base Stations 18 are connected to the BSC 20 via backhaul connections. Each of these backhaul connections may be a bio-directional PtP wire line or wireless communication facility. The Base Stations 18 are typically installed indoors and are connected to outdoor antennas installed on the tower. Each BS 18 may have a serving area which typically extends up to 20 miles. Each MS/SS 16 may be connected to a Remote Terminal via an Ethernet or a serial interface, such as RS232, for example.

The BS 18 may be an indoor, single sector device housed in a 19", 1 U enclosure and connected to an outdoor Omni or sectorized antenna through a low loss RF cable. A multiple (typically 3) sector Base Station may be formed by stacking multiple single sector base station units on top of each other and connecting each unit to an outdoor sectorized antenna. The SS is either a Mobile Station (MS) designed for installation in a cabin of a truck or a Fixed Station (FS) designed as an outdoor device for installation on an electrical pole.

Reference is now made to FIG. 2, which is a schematic illustration of the platform architecture of the Base Station (BS) and Subscriber Station (SS).

In one embodiment of the invention, the Base Station (BS) and the Subscriber Station are designed in Software Definable Radio (SDR) architecture as shown in FIG. 2.

The architecture of FIG. 2 consists of a baseband processor section 30 and an analog front end section 32.

In one embodiment of the invention, the baseband processor section has a Software Definable Radio (SDR) architecture in which all transmit and receive signal processing functions (including the PHY layer and the MAC layer) are implemented in software. The SDR architecture of the baseband processor section allows the system to support of a wide range of waveforms and the downloading of new waveforms even after the system is deployed in the field. This flexibility is required to facilitate operation in a wide range of scenarios as outlined in this invention.

Figure 4A:
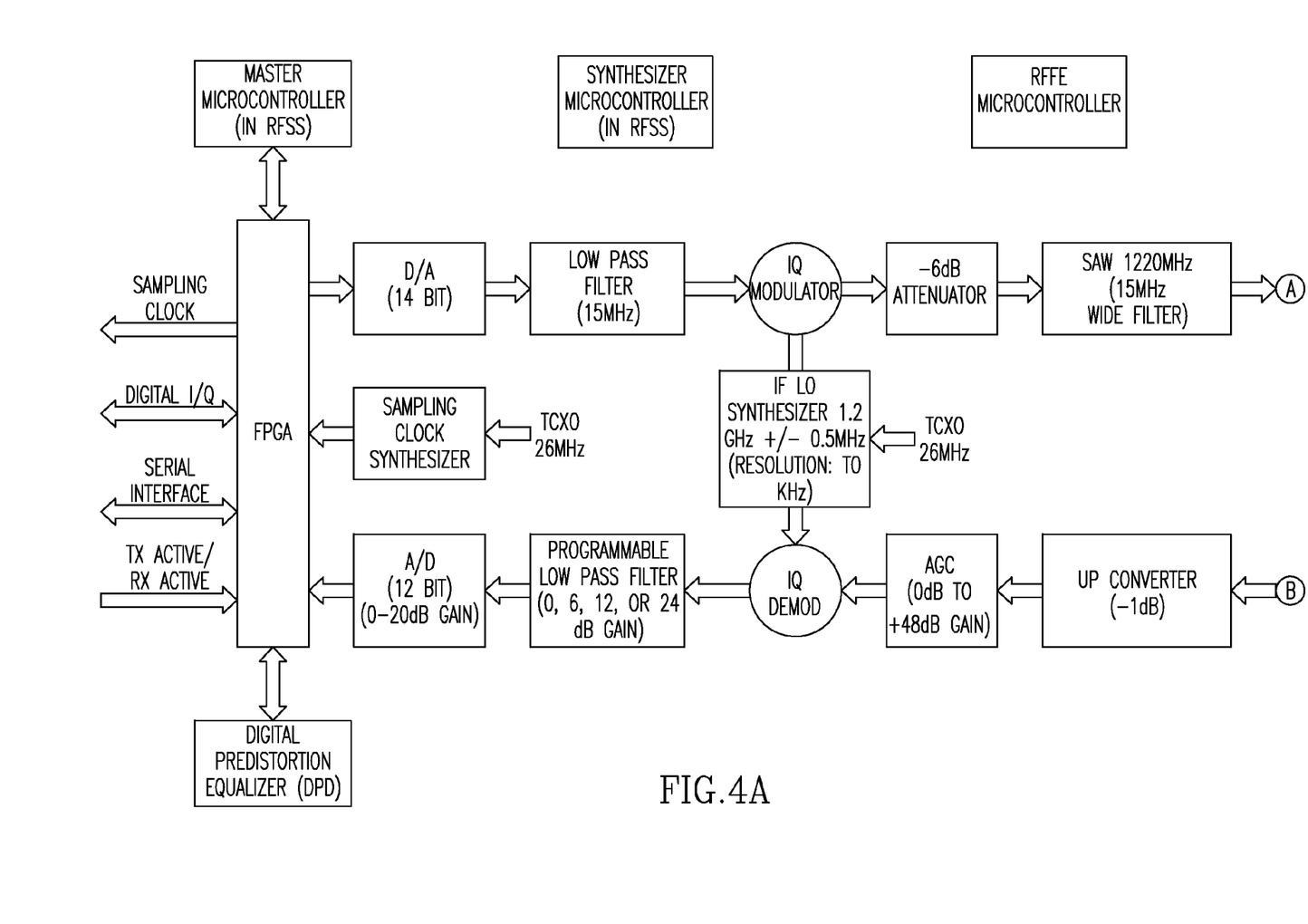
FIG. 4 is a schematic illustration of the components of the device for implementing a Block Diagram of BS and MS Analog Front End in accordance with an embodiment of the invention.
Figure 4B:
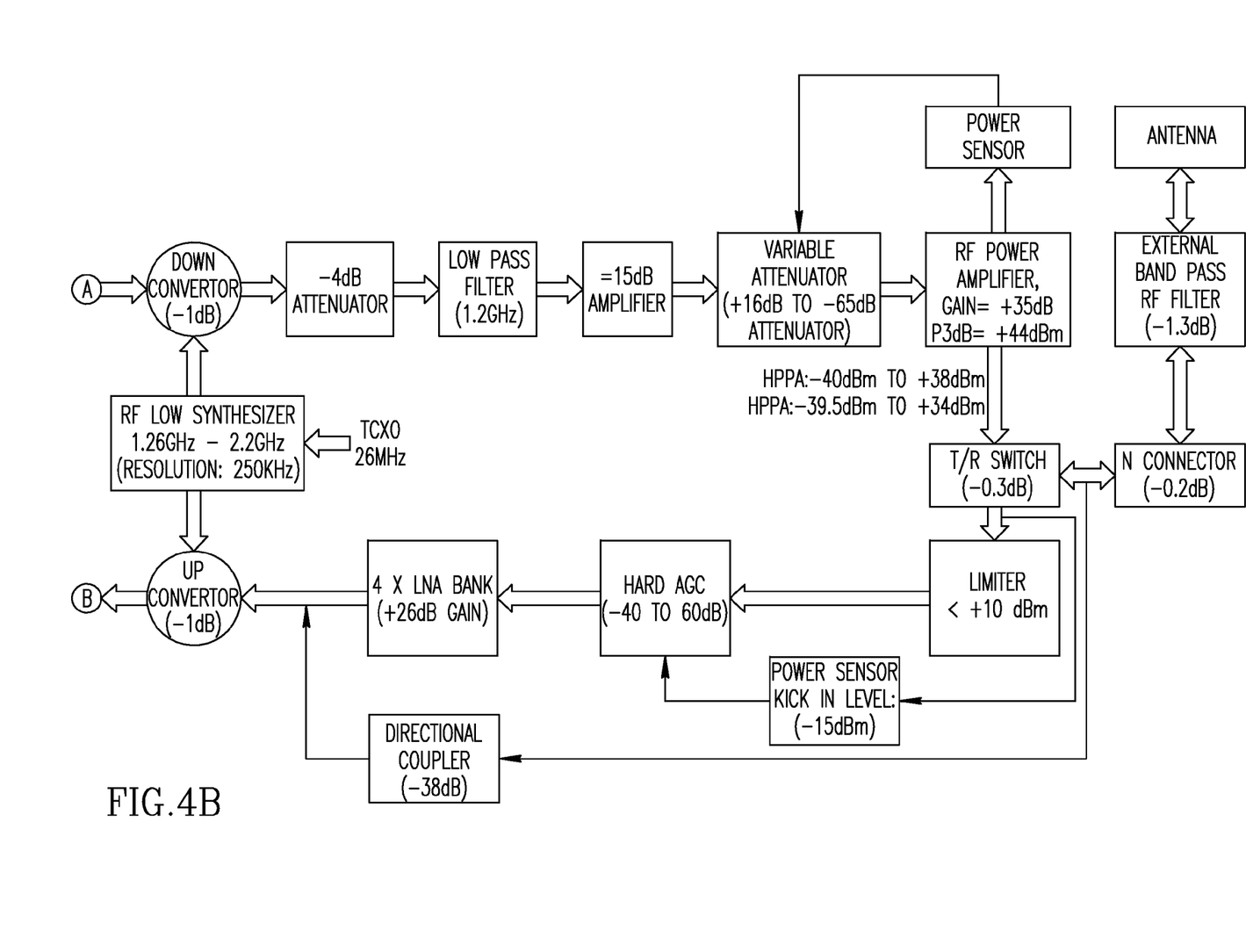

One embodiment of the analog from end section is illustrated in FIG. 4 and is described in this paragraph. This embodiment can be used in conjunction with the above SDR embodiment. In this embodiment the analog front end section operates over a very wide frequency range and over a wide range of channel types as outlined here. It is designed for TDD operation, i.e., the TX and the RX sections are connected to the antenna through a Transmit/Receive switch. The analog front end may perform the following functions:

In the TX direction:
  I/Q Modulation, i.e., converting digital 1 & Q signals to a real signal.

Two stage frequency translation as follows:
  Frequency up conversion from Baseband to IF frequency of 1,220 MHz.
  Frequency down conversion from IF frequency to the RF frequency (any frequency between (any frequency between 40 MHz and 958 MHz).

Setting of the TX power level by means of a wide dynamic range variable attenuator and a high power Power Amplifier (PA). —Filtering to suppress out of channel and out of band interference as required to meet the FCC requirements (e.g., Spectrum Mask) for each frequency band. A Digital Pre-Distortion (DPD) equalizer may be used to facilitate filtering the wide range of channel configurations as described above. The DPD adds pre-distortion to the TX signal to cancel the distortion in the TX path, most of which is generated in the Power Amplifier. The computation of the pre-distortion is based on a feedback path from the antenna port through a coupler.

Feed the signal(s) to the antenna(s) through a high power T/R switch as needed to support Time Division Duplex (TDD) or Half Duplex Frequency Division Duplex (H-FDD) operation, i.e., at any point of time, the Analog Front End circuitry is Either in transmit mode, in receive mode or in idle mode but it does not transmit and receive at the same time.

In the RX direction
  Reception of the signal from the antenna through the T/R switch. A hard AGC is used to attenuate excessive power signals prior to the LNA.
  Low Noise Amplifier (LNA) bank system. A different LNA path is selected, depending on the RF frequency used to maintain a fixed gain over the entire frequency range.
  Two stage frequency translation including:
  1. Up conversion of the signal from RF to IF at 1,220 MHz.
  2. Down conversion from IF frequency to baseband.

Analog filtering at the RF, IF and baseband levels before ND conversion to avoid excessive noise and interference overloading and desensitizing the digital filtering stage at the baseband processor. The RF filter is a wide band filter covering the entire frequency range below 1 GHz. IF filtering employs a bank of filters for different channel sizes. A programmable analog filter is used at baseband.

Automatic Gain Control (AGC) to map a wide range of RX signal power into a narrower window at the ADC. Note that the AGC is used at the SS while the BS employs a closed loop power control to regulate the TX power of the SSs such that they are received at the BS within a narrow RX power window.

I/Q Demodulation

Figure 3:
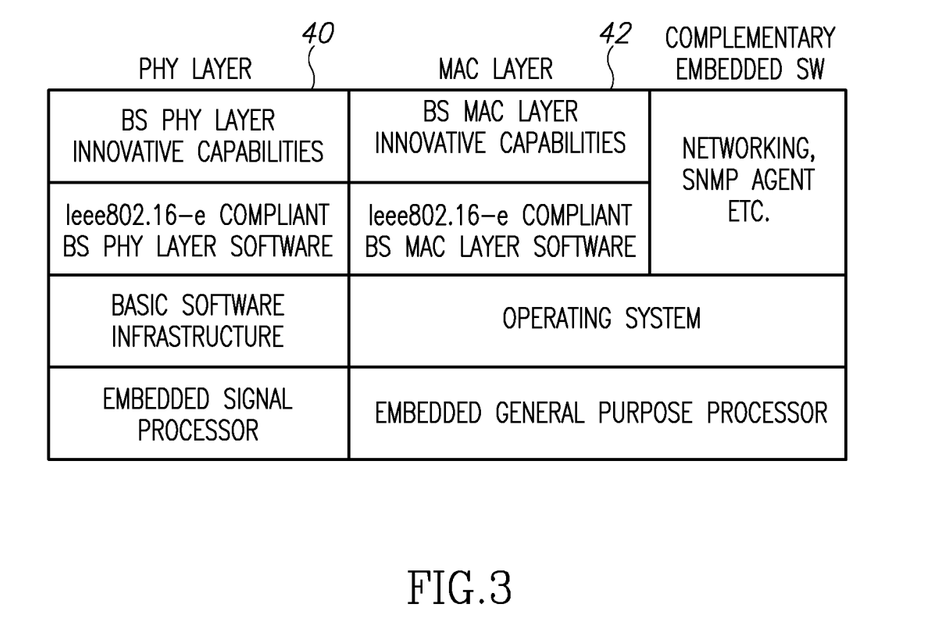
FIG. 3 is a schematic illustration of the Base Station (BS) and Mobile and Fixed Station (SS) software architecture.

Reference is now made to FIG. 3 which is a schematic illustration of the software architecture of the Base Station 18 (BS) and Subscriber Station 16 (SS). This architecture is designed to leverage as much as possible from off-the-shelf 802.16e and mobile WiMAX intellectual properties to implement the BS and MS PHY 40 (physical layers) and MAC 42 (Media Access Controller) layers. As shown in FIG. 3, the software innovation described in this application occurs is in the upper layer of the software architecture.

In accordance with the preferred embodiments of the invention the system delivers broadband data communication service to mobile and fixed SSs over the same band. This is accomplished by combining the following methods:
  By supporting wide range of Modulation and Coding Schemes (MCSs). The MCS is selected automatically per SS and per direction (i.e., the downlink MCS is selected independent of the MCS in the uplink direction), based on the Carrier to Interference and Noise Ratio (CINR) at any point in time. The selection of MCS is done by an automatic Link Adaptation (LA) algorithm running in the BS. The LA algorithm employs a set of CINR thresholds to determine the MCS per MS and per FS. Each MCS has a high CINR threshold to switch a MS/FS to this MCS from a lower MCS and a lower threshold to switch to a lower MCS. The system employs multiple set of thresholds one set per each type of users based on their channel model characteristics. In one embodiment of the invention, one set of thresholds is used for Fixed Stations with directional antennas and with Line of Sight to the Base Station, a second set of threshold is used for Fixed Stations with non Line of Sight conditions and a third set of thresholds is used for Mobile Users.

In accordance with the preferred embodiments of the invention a closed loop Power Control (PC) algorithm is used in conjunction with the LA algorithm to determine the TX power level at the Fixed and Mobile Station. The combined algorithm is referred to as LAPC. This algorithm can be configured per type of user (fixed or mobile) to maximize throughput or to minimize power consumption.

In one embodiment according with the invention the lowest MCS is QPSK ½ and the highest MCS is 64QAM ¾. The difference of CINR required for error free operation in these two MCS is about 15 dB to 20 dB. A maximal throughput LAPC algorithm will increase the SS TX power trying to bring it to operate at 64QAM ¾ while a minimum power LAPC algorithm will reduce the SS TX power as long as it can operate at QPSK ½. The difference in SS TX power between the two algorithms could be 20 dB.

The Base Station scheduler has an Admission Control (AC) algorithm which determines if a dynamic service request by a Subscriber Station can be granted. A dynamic service request is made for a service for which the base station needs to secure bandwidth (e.g., a service with minimum guaranteed rate). The AC selects a MCS in determining the resources needed to serve the request. This MCS determines how many slots need to be allocated to serve the service. A lower MCS requires more slots than a higher MCS. In the case of a Fixed Station, the last MCS used by the respective FS is assumed by the AC because the MCS of a Fixed Station id typically fixed. While in the case of a MS, an a-priori configured MCS is used (this is typically selected as QPSK ½ but it can be configured to a less conservative value, depending on the appropriate channel model).

The Network Management System (NMS) identified each Subscriber Station as Fixed or Mobile. A disconnection of a FS from its BS is considered a fault event and an alarm is reported. A disconnection of a MS from the network however is not considered a faulty event.

In one embodiment of the invention, all Subscriber Stations have a GPS receiver. The location of the MS is reported automatically and periodically to the NMS while in the FS, the location is reported only once during network entry.

In one embodiment of the invention we avoid the use of the Base Station Controller since the BS coverage is very large and according with the preferred embodiment, the system is using sub channel base sectorization, and therefore it removes the need for handoff inside a BS between different sectors.

In Accordance with the preferred embodiment of this invention, long range communication can be made available through Operation in frequencies with good propagation characteristics and good clutter penetration (e.g., frequencies below 1 GHz). More over the preferred embodiment of this invention is delivering an exceptional receiver sensitivity by:

Operation in licensed frequencies in which the noise floor is determined by the thermal noise only.

In one embodiment of the invention, the system operates in unlicensed frequencies in which case, the receiver sensitivity depends on the level of interference generated by other users.

The channel size is configurable and the lower the channel size provides a lower noise floor that is required for the long range communications.

In one embodiment of the invention, the transmission employs OFDMA modulation with 128 sub-carriers as defined in IEEE802.16e-2005. The subcarriers are partitioned into 3 sub-channels in the downlink direction and 4 sub-channel in the uplink. Each sub channel contains a subset of the 128 subcarriers and are orthogonal to each other. This means that two transmitters transmitting at the same time in the same channel but over different sub channels are not interfering with each other. The subcarriers of each sub channel may be adjacent or non adjacent.

In the preferred embodiment of the invention, the system utilizes a high performance low noise RF front end at both the BS and the SS.

In one embodiment of the invention the system utilizes advanced signal processing techniques, and is supporting high TX power from both BS and SS.

In a preferred embodiment of the invention, the system operates over a very wide frequency range and channel bandwidths. The wide frequency range and channel bandwidths has the benefit of supporting a large number of prime (i.e., good propagation) frequency opportunities. The intent is to employ the highest propagation bands available in each location rather than operate in every location at the same band. These high propagation band opportunities are typically available in a wide range of bandwidths. They may be used by the system due to its ability to operate in a wide range of channel bandwidth. The wide range of frequency opportunities supported by the system, also buys the customer negotiation power with frequency holders (i.e., avoid locking into a single frequency holder).

In accordance with the above, in one embodiment of the invention, the frequency band of operation is:

It is below 1 GHz (20 MHz to 958 MHz)

Any channel bandwidths between 200 KHz and 20 MHz are supported

The channel can be partitioned to multiple sub channels

The applicable FCC rules are used for each sub-band in the above range.

In another embodiment of the invention, the individual channel consists of one or more frequency segments which may or may not be adjacent to each other. The minimum bandwidth of a segment is 25 KHz. (e.g., a 200 KHz wide channel can be formed from a single 200 KHz segment, from two non adjacent 100 KHz wide segments, from four non adjacent 50 KHz wide channels or from eight non adjacent 25 KHz segments). The band of operation is dedicated to the broadband data service or it may be shared with another service (e.g., PLMR voice) by the same operator in which case a sharing mechanism will be needed. By having this unique characteristic, the preferred invention enables the system to operate within existing bands without interference while deliver a very high bandwidth.

In a preferred embodiment of the invention, the system employs Time Division Duplex (TDD), i.e., downlink transmission from BS to SSs and uplink traffic from SSs to BS is done over the same channel frequency but at different periods of time. TDD provides the most flexibility since the system can operate in both paired and unpaired spectrum opportunities. When operating in TDD mode, the bandwidth can be configured in any ratio between the downlink and the uplink direction. The DL:UL ratio is configured based on the application requirements.

In another embodiment of the invention, different channel frequencies are used for transmit and receive by the BS and SSs but transmit and receive are still done in different time periods (this is referred to as Half Duplex FDD).

In another embodiment of the invention, the system employs Frequency Division Duplex (FDD), i.e., downlink transmission from BS to SSs and uplink traffic from SSs to BS is done over different frequencies at the same time.

In one preferred embodiment of the invention, the system employs the existing PLMR tower and backhaul infrastructure to maintain coverage across the serving area (same as voice). In another embodiment of the invention, the system employs its own towers and/or backhaul infrastructure.

Figure 7:
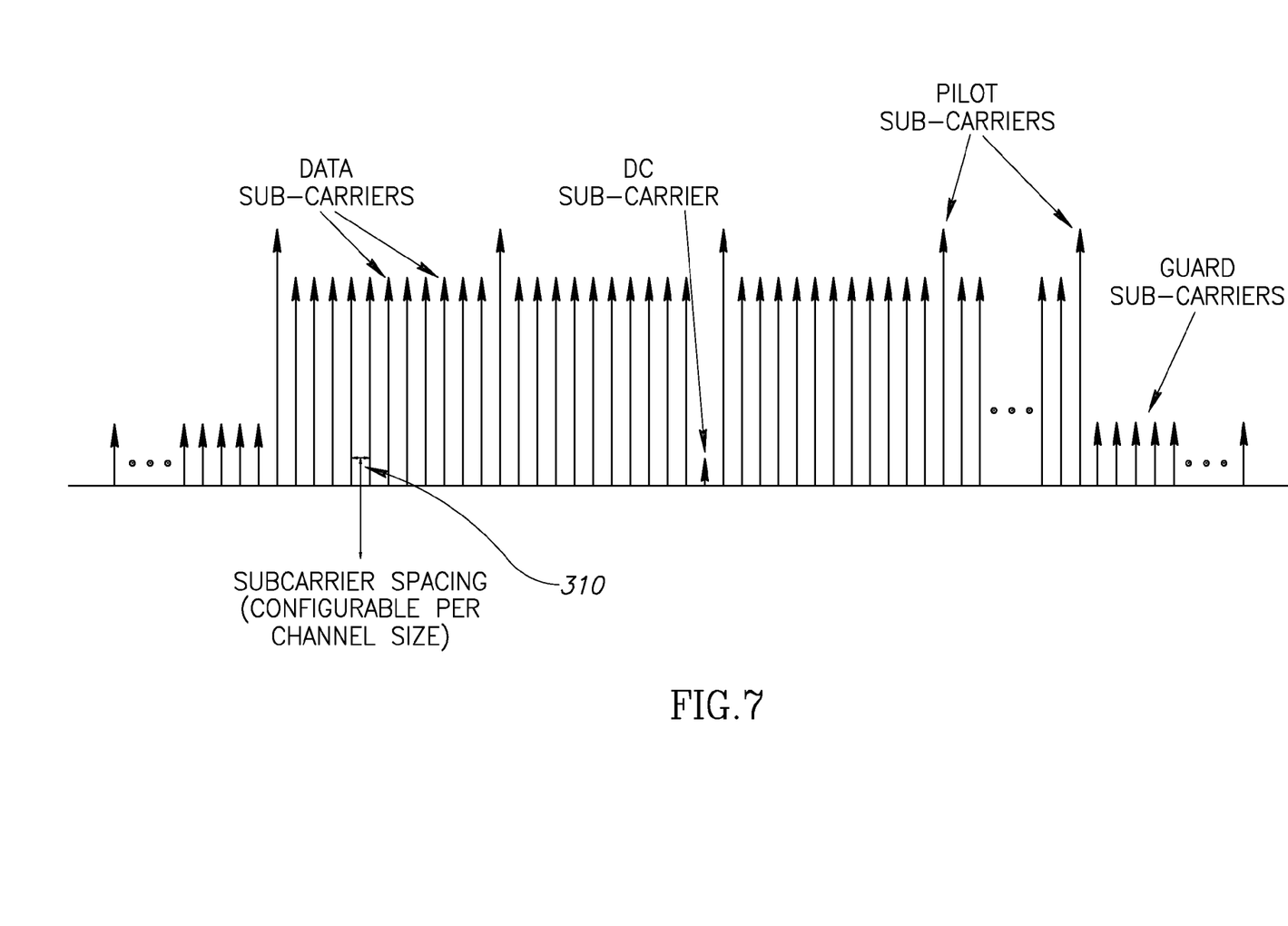
FIG. 7 is a schematic illustration of an OFDMA Waveform Structure, in accordance with an embodiment of the invention.

Reference is now made to FIG. 7 which illustrates an exemplary an OFDMA Waveform Structure. In a preferred embodiment of the invention, the system employs a modified version of the ieee802.16e-2005 standard for the air interface protocol. In this preferred embodiment the BS and SS PHY Layer supports non standard channel sizes below 1.25 MHz wide bandwidth (e.g., BW=200 KHz, 400 KHz, 500 KHz and 1 MHz) by scaling down the sub-carrier frequency spacing (310 in FIG. 7) relative to the sub carrier spacing as defined in the IEEE802.16e-2005 standard for the 128 FFT configuration designed for a 1.25 MHz wide channel. The sub carrier spacing is reduced as follows:

Basic Symbol Rate (BSR) Selection:

The basic symbol rate is maximized (for maximum throughput) subject to the available channel bandwidth, the applicable FCC rules (including spectrum mask) the subcarrier configuration scheme and the resulting EVM. The system supports a number of subcarrier configuration schemes including standard subcarrier configuration schemes as defined in ieee802.16e-2005 and non standard subcarrier configuration scheme. This includes, and not limited to 128, 512 or 1024 sub carriers, and their split into guard subcarriers, pilot subcarriers and data transport subcarriers. It also defines their partitioning into sub channels.

Figure 6:
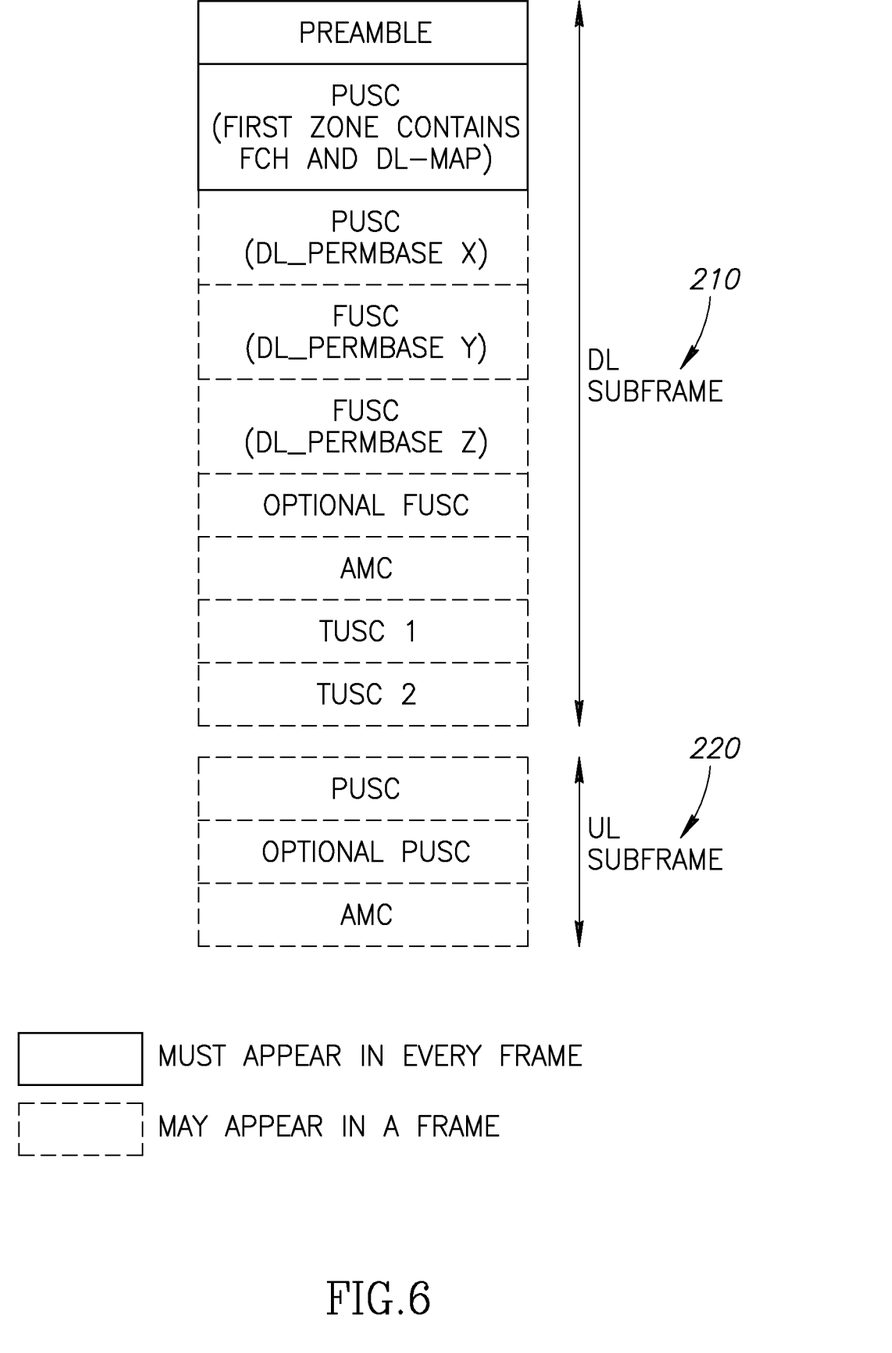
FIG. 6 is a schematic illustration of a Multi Zone Frame Structure, in accordance with an embodiment of the invention.

Reference is now made to FIG. 6 which illustrates an exemplary for a Multi Zone Frame Structure. In one embodiment of the invention using TDD, since the same channel is used for both downlink and uplink transmission, it is desirable to have the same number of subcarriers in both directions. This is because given the same subcarrier spacing in the downlink and in the uplink, if the number of subcarriers is different; the bandwidth in the direction with smaller number of subcarriers is not maximized. This embodiment of the invention employs an innovative downlink (210 in FIG. 6) subframe structure in which the first zone employs FUSC instead of PUSC and the uplink subframe employs PUSC configuration (220 in FIG. 6). This scheme has 96 active subcarriers in both downlink and uplink subframes.

In one embodiment of the invention, the symbol rate also needs to satisfy the requirement that the number of frames within 1 sec interval is an integer.

Figure 5:
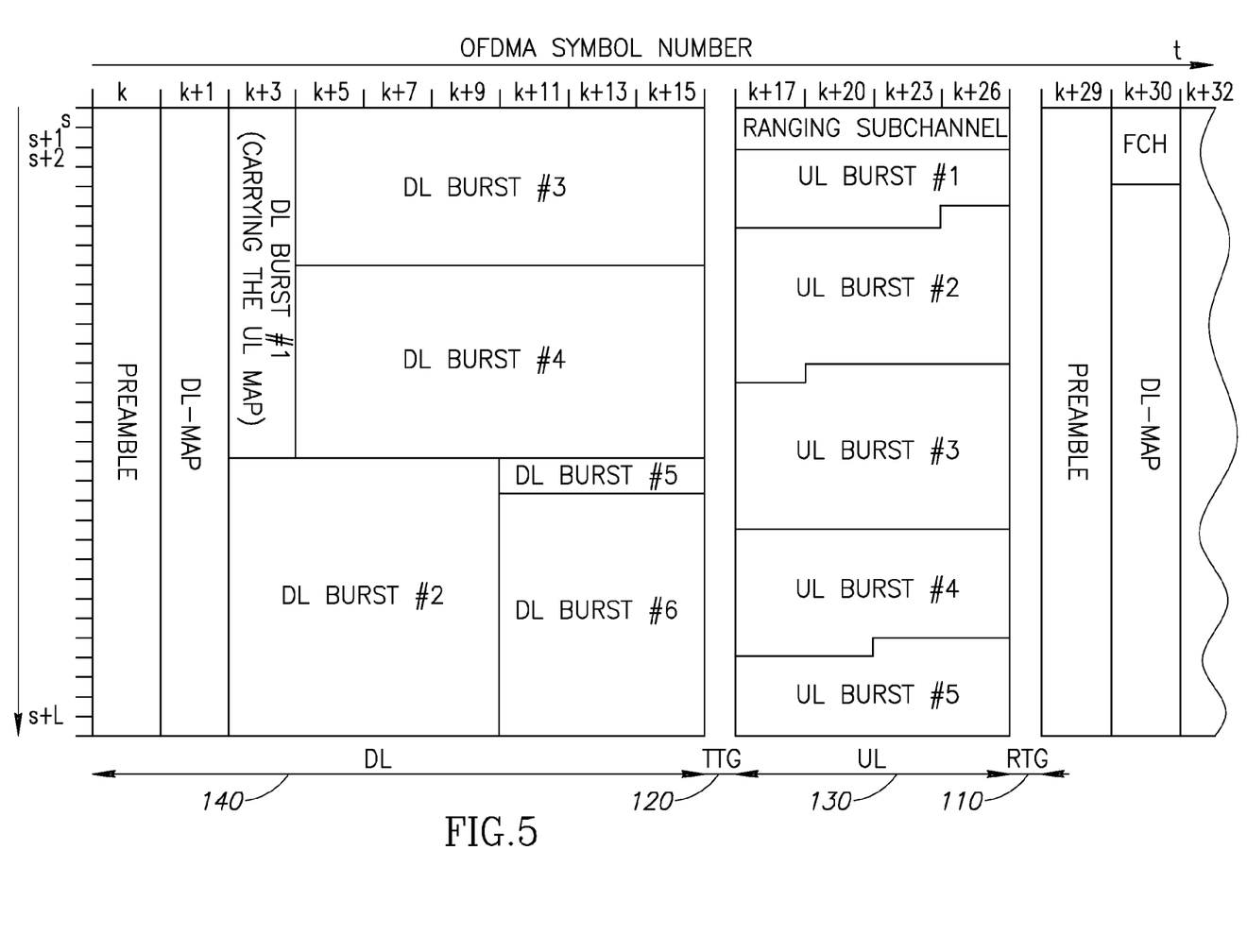
FIG. 5 is a schematic illustration of an OFDMA Frame Structure with single zone in Downlink (DL) and in Uplink (UL), in accordance with an embodiment of the invention.

Reference is now made to FIG. 5 which illustrates an exemplary for an OFDMA Frame Structure with single zone in Downlink (DL) and in Uplink (UL). The duration of the OFDMA symbol ($T_{os}$) is determined as follows:

$$T_{os} \text{ in } \mu s = NFFT*(1+CP)/BSR \text{ in Hz,}$$

$N_{FFT}$=Total number of subcarriers including data transport subcarriers, guard subcarriers, pilots and DC subcarrier
BSR=Basic Symbol Rate
CP—Cyclic Prefix. This is the extension of the OFDMA symbol to make it robust against multipath. Typical values of CP can be ⅛, and 1/16. The higher the CP value, the better the Multipath performance.

In one embodiment of the invention, the channel bandwidth (BW) BW=500 KHz, BSR=560 KHz, CP=⅛ and $N_{FFT}$=128. The OFDMA symbol duration $T_{os}$=⅛*(1+⅛)/560,000=257.14 μs.

The duration of the OFDMA frame ($T_{of}$) is determined as follows:

$$T_{of} = (N_f * T_{os}) + TTG + RTG \text{ where:}$$

$N_f$ is the number of OFDMA symbols in one OFDMA frame.
RTG (110 in FIG. 5) is the Receive to transmit gap in a Base Station of a TDD System
TTG (120 in FIG. 5) is the Transmit to Receive gap in a Base Station of a TDD system.
In one embodiment of the invention, BW=500 KHz, BSR=560 KHz, CP=⅛, $N_{FFT}$=128, $N_f$=47 and a coverage of 20 miles is required.
TTG>RTD+SSRTG where RTD is the Round Trip Delay and SSRTG is the Receive to Transmit gap at the Subscriber Station.
RTD=214 μs for 20 miles and SSRTG>50 μs in this embodiment of the invention. Also, in this embodiment of the invention, an integer number of frames should align with a one second interval for GPS synchronization purposes.

$$T_{of} = 47*128*(1+⅛)/560,000 + TTG + RTG > 12.35 \text{ msec.}$$

The frame duration is adjusted to 12.5 ms so that an integer number of frames will fit in one second. Please note that the $N_f$=47 symbols used in this invention is not limiting, but as example, since this disclosure supports many other values like: $N_f$=95 symbols and $N_f$=141 symbols. The increase in $N_f$, the increase in frame duration, reduces the percentage of per frame overhead and increases throughput.

In other preferred embodiments of the invention, the BS and SS PHY Layer support non standard channel sizes as follows:
When the channel size is above 1.25 MHz (e.g., BW=2 MHz and 2.5 MHz) the sub-carrier frequency spacing is scaled up relative to the sub carrier spacing as defined in the IEEE802.16e-2005 standard for the 128 FFT configuration designed for a 1.25 MHz wide channel.
When the channel size is above 2.5 MHz (e.g., BW=3 MHz and 4 MHz) the sub-carrier frequency spacing is scaled down relative to the sub carrier spacing as defined in the IEEE802.16e-2005 standard for the 512 FFT configuration designed for a 5 MHz wide channel.
When the channel size is above 5 MHz (e.g., BW=6 MHz) the sub-carrier frequency spacing is scaled up relative to the sub carrier spacing as defined in the IEEE802.16e-2005 standard for the 512 FFT configuration designed for a 5 MHz wide channel.
In another embodiment of the invention, the BS and MS/SS PHY Layer support non standard channel sizes of BW (BW<1.25 MHz) by scaling down the number of sub-carriers while maintaining a constant sub-carrier frequency spacing. The spacing may be equal to the IEEE802.16E-2005 spacing (10.94 KHz) or may be different. The frequency spacing depends on speed requirements, distance and multipath conditions.

Yet in another embodiment of the invention an ieee802.16e standard channel or a non standard channel as outlined above is divided into a number of standard or non standard sub channels. The sub-carriers of each sub-channel are limited to a single frequency segment Sub-channels falling in between available frequency segments will not be used for transmission. Out of band/out of channel interference in the transmit direction and selectivity (i.e., avoiding interference from signals received over frequencies between available frequency segments) in the receive direction is maintained by the analog front end. Note that orthogonality is maintained between the active sub channels.

In one embodiment of the invention, the system employs a modified version of the ieee802.16e-2005 standard for the air interface protocol with non standard values for the following parameters:
Transmit to Receive Gap (TTG) can take any number, for example: TTG>214 μs to support operation over long range.
The frame size is extended beyond 47 OFDMA symbols and can be, but not limited to, 95 symbols and 141 symbols.
The initial ranging allocation region is extended as need to support the range.

In a prefer embodiment, the system supports a wide range of frequency reuse schemes. The following frequency resources may be reused, including but limited to:
The same channel frequency can be reused in multiple sectors. The same sub-channel can be reused in multiple sectors (i.e., the same channel is used in the respective sectors but a different subchannel is used in each).

When the same channel is used in multiple sectors, Fractional Frequency Reuse (FFR) can be used. In this scheme, the downlink subframe and the uplink subframe of the TDD frame are divided into two or more regions or zones. The TDD frame along with its division into zones is GPS synchronized across the system. The same channel but different sub channels are used in each zone to allow for a different sub channel reuse scheme in each zone. For example, the first zone in the downlink and in the uplink direction may use all available sub-channels while in the second zone, distinct sub-channels are allocated for each sector. In this example, the first zone in the downlink and the uplink is used for transmission by SSs which don't interfere with each other due to distance, or geographical obstacles (e.g., mountains). The allocation of transmission slots in the downlink and in the uplink direction for each Mobile and Fixed Station is done by the Base Station scheduler based on the Carrier to Interference and Noise Ratio (CINR) for the respective Mobile and Fixed Subscriber Station.

In one embodiment of FFR in this invention, the transmitted waveform is as defined in the IEEE802.16e-2005 standard for 128 FFT except that the symbol rate, number of OFDMA symbols per frame, TTG, RTG and other parameters of the frame employ values different from those defined in the standard. The downlink subframe is partitioned into two zones. The first zone may employ a Partial Use of Sub Carriers (PUSC) permutation which will be configured in each sector for the use of a single subchannel (this will be referred to as "reuse 3 zone). The second zone in the downlink subframe may be also employ PUSC permutation but this zone will support all 3 subchannels (this will be referred to as "reuse 1 zone). A similar partitioning will be done in the uplink subframe. Mobile and Fixed Stations with high CINR will be allocated transmission opportunities in the "reuse 1 zone"

while Mobile and Fixed Stations with low CINR will be allocated transmission opportunities in the "reuse 3 zone". Fractional Frequency Reuse allows for dynamic move of bandwidth from one sector to the other and is therefore an effective solution for a mobile workforce which moves over time from one sector to another.

The system is designed to deliver high throughput and maintain broadband communication experience even when operating in narrow channels.

In one embodiment of the invention, the system employs Packet header Suppression (PHS) in both downlink and uplink direction as defined in ieee802.16e-2005. The transmit side at both BS and MS removes preconfigured constant header fields from the packets and these are re-added at the receive side. Moreover, the system support dynamic PHS which allows the compression of slowly changing header fields by learning the values of these fields and synchronizing these values automatically between the BS and SS.

In one embodiment of the invention, the system employs the standard TDD frame structure of the ieee802.16e-2005 standard but the frame size is extended to reduce per frame overhead.

In one embodiment of the invention, the system employs the standard TDD frame structure of the ieee802.16e-2005 standard and the throughput is improved by optimization of DL:UL ratio for the dominant application used. For example, in a Supervisory Control And Data Acquisition (SCADA) application, the capacity required in the uplink direction is much higher than the capacity in the downlink direction. The TDD frame can be configured in a reverse asymmetrical ratio (e.g., frame size of 95 symbols with 29 symbols in the downlink subframe and 66 symbols in the uplink subframe). The size of the downlink and uplink subframes is optimized as follows:

With uplink PUSC, the uplink slot extends over 3 OFDMA symbols. The size of the uplink subframe is therefore selected to be a multiple integer of 3

With downlink PUSC, the downlink slot extends over 2 OFDMA symbols. Taking into account the single symbol preamble, the downlink subframe is selected as an odd number.

Throughput is also maximized by maximizing the Basic Symbol Rate (BSR) as outlined in Paragraph 8 above. The BS and SS have a programmable TX filtering capability which is used to match the spectral mask as specified by the FCC for each frequency band. In addition, given that the frequency band employed is often an aggregation of multiple narrow channels (e.g., 25 KHz wide channels) an interpretation of the rules is done to maximize the symbol rate while maintaining the FCC limits for outband harmful interference. As an example, when the system operates between 217 MHz and 218 MHz or between 219 MHz and 220 MHz (this is referred to as the AMTS band), a power density spectral mask is used in which the TX power in every 1 KHz range outside the band is below the maximum TX power in the same band under the current rules.

The methods described in paragraphs 113-118 above help increase the one way throughput in the downlink and in the uplink direction but the latency introduced in each direction when operating in narrow channels reduces throughput when Ack based flow control is used. This is most significant when the TCP protocol is used since this is the most common protocol in Internet applications. The system employs a TCP acceleration scheme by spoofing the TCP Acks. In one embodiment of the invention, the system employs the ieee802.16e-2005 Hybrid Automatic Repeat reQuest (HARQ) scheme to support the TCP Ack spoofing algorithm. The HARQ is an efficient PHY layer mechanism used to guarantee the delivery of packets over the air.

The system is designed to support mission critical and smart grid applications such as SCADA with a Master Station at the Network Operating Center (NOC) and many Remote Terminal Units (RTUs) across the grid. SCADA communication employs many legacy byte oriented and bit oriented SCADA protocols with DNP3 being the most common for new SCADA deployments. The RTU typically employs DNP3 over serial (e.g., RS232) interface while the master typically employs DNP3 over TCP/IP or over UDP/IP. In one embodiment of the invention, the system employs the ieee802.16e-2005 MAC Common Part Sublayer and the packet service Specific Sublayer. The support of byte oriented SCADA protocols is added as an additional non standard type of packet service specific sublayer.

Embodiments of the invention are described above with reference to block diagrams and schematic illustrations of methods and systems according to embodiments of the invention. It will be understood that each block of the diagrams and combinations of blocks in the diagrams can be implemented by a person skilled in the art.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, wireless communication devices and wire line communication devices and networks between. A person skilled in the art will appreciate that the given description of the unique aspects of the inventions can be implemented, and that existing technologies can be modified according with the invention to deliver the said system.

This written description uses examples to disclose the invention, including the best mode, and also to enable any person skilled in the art to develop the invention, including making and using any existing and new devices after modifications, and systems, to deliver this invention. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A point to multipoint wireless Orthogonal Frequency Division Multiple Access (OFDMA) system comprising:
   a Network Operating Center (NOC) comprising at least one of a group including a Base Station controller, a central router hub, an Authorization, Authentication, Accounting (AAA) server and a Network Management System (NMS) server;
   a plurality of base stations, each of said base stations covering at least one sector; and
   a plurality of mobile stations and fixed subscriber stations;
   wherein each of said plurality of base stations maintains two-way data communication with said plurality of mobile stations and fixed subscriber stations in its serving area, concurrently, over licensed and unlicensed frequency bands;
   wherein said base station controller is in communication with said base stations and fixed subscriber stations and mobile stations;

wherein said licensed and unlicensed frequency bands are within a range below 1 GHz;

wherein said two-way communication operates in accordance with mobile wireless standard air interface standard (ieee802.16e-2005), which is modified for dedicated channel sizes below 1.25 MHz;

wherein modulation and coding schemes are automatically selected for each of said plurality of Mobile and Fixed subscriber stations in downlink and uplink directions;

wherein the system is configured to compare the Carrier to Interference and Noise Ratio (CINR) in the downlink direction and in the uplink direction at any point in time with a preconfigured set of thresholds, wherein each of said modulation and coding schemes comprises another preconfigured set of thresholds;

wherein the preconfigured set of thresholds for said modulation and coding schemes is adjusted to match the channel characteristics of each of said plurality of Mobile and Fixed subscriber stations; and wherein a different set of thresholds is configured for said fixed subscriber stations having a line of sight, said fixed subscriber stations with non line of sight conditions, nomadic stations and said mobile stations.

2. The system according to claim 1, wherein said licensed and unlicensed frequency bands have a wide tuning frequency range from 40 MHz to 1 GHz.

3. The system according to claim 1, configured to operate within multiple Land Mobile Radio (LMR) narrow channels sizes where the bandwidth of the individual LMR channels is any of a group of bandwidths including 6.25 KHz, 12.5 KHz, 25 KHz or 50 KHz.

4. The system according to claim 1, utilizing OFDMA sub channels to communicate in multiple non adjacent channels.

5. The system according to claim 1, configured to serve said Mobile Stations and fixed Subscriber Stations over the same frequency band.

6. The system according to claim 1, wherein transmit (TX) power levels and modulation and coding schemes used by each of said plurality of Fixed Subscriber and Mobile Station are determined by a closed loop Power Control algorithm used in conjunction with a Link Adaptation algorithm.

7. The system according to claim 1, further comprising a scheduler using a different Admission Control (AC) algorithm for each of said plurality of mobile stations and fixed subscriber stations to determine whether a dynamic service request by a Subscriber Station can be granted.

8. The system according to claim 1, further comprising a Network Management system to distinguish between the fixed subscriber stations, to determine whether a station is fixed or mobile.

9. The system according to claim 1, configured to be embodied with GPS based Time Division Duplex (TDD) frame synchronization of one of a group of stations including the base stations and the fixed subscriber stations and mobile stations.

10. The system according to claim 1, wherein the ieee802.16e-2005 standard for the air interface protocol is modified to comprise a group of configurable parameters including a Transmit to Receive Gap (TTG) comprising any value configured to support operation over long range, a number of OFDMA symbols in downlink and uplink sub frames extends beyond a standard 47 OFDMA symbols and an initial ranging allocation region is extended according to a required range.

11. The system according to claim 1, wherein frequency and time resources are reused by at least one of a group of schemes including reuse of the same channel in another sector, use of the same sub-channel in another sector and re-use of the same time zone in another sector.

12. The system according to claim 11, wherein channels are reused in multiple sectors and bandwidth is moved from one sector to another dynamically by means of Fractional Frequency Reuse (FFR).

13. The system according to claim 12, wherein a downlink subframe is partitioned into a first and second zone; and wherein the first zone employs a Partial Use of Sub Carriers (PUSC) permutation configured in each sector for the use of a single sub-channel.

14. The system according to claim 13, wherein the second zone in the downlink subframe is configured to employ PUSC permutation in three subchannels.

15. The system according to claim 13, wherein an uplink subframe is partitioned into a first and second zone; and wherein the first zone in the uplink subframe employs a Partial Use of Sub Carriers (PUSC) permutation configured in each sector for the use of a single sub-channel; and wherein the second zone in the uplink subframe is configured to employ PUSC permutation in three subchannels.

16. The system according to claim 1, further comprising dynamic Packet Header Suppression (PHS) in both downlink and uplink directions, thereby allowing for a compression of fixed and slowly changing header fields; wherein the compression of slowly changing header fields is configured by automatically learning a plurality of values of these fields and synchronizing these values automatically between the base stations and fixed subscriber stations and mobile stations.

17. The system according to claim 1, comprising Time Division Duplex (TDD) frame structure of the ieee802.16e-2005 standard and wherein the size of each frame with said TDD frame structure is extended thereby to reduce the overhead of each frame.

18. The system according to claim 17, a number of OFDMA symbols in a downlink subframe and a number of OFDMA symbols in the uplink subframe are optimized, to maximize throughput depending on application characteristics.

19. The system according to claim 1, comprising a programmable transmit and receive (TX) filtering capability in the base stations and fixed subscriber stations and mobile stations, said transmit filtering configured to match a spectral mask as specified by the Federal Communications Commission (FCC for each frequency band and said receive filtering capability configured to match the bandwidth of the channel, depending on a symbol rate, thereby maximizing the Basic Symbol Rate (BSR) for the given channel.

20. The system according to claim 1, comprising a service specific SCADA (Supervision Control and Data Acquisition) convergence sub layer added on top of an IEEE802.16e-2005 MAC common part sublayer, thereby to support byte and bit oriented SCADA protocols.

21. The system according to claim 1, wherein the Base Station and the fixed subscriber stations and mobile stations utilize a Software Definable Radio (SDR) architecture, thereby to support dynamic channel and air interface architecture.

22. A point to multipoint wireless Orthogonal Frequency Division Multiple Access (OFDMA) system comprising:

a Network Operating Center (NOC) comprising at least one of a group including a Base Station controller, a central router hub, an Authorization, Authentication, Accounting (AAA) server and a Network Management System (NMS) server;

a plurality of base stations, each of said base stations covering at least one sector; and a plurality of mobile stations and fixed subscriber stations;
wherein each of said plurality of base stations maintains two-way data communication with said plurality of mobile stations and fixed subscriber stations in its serving area, concurrently, over licensed and unlicensed frequency bands;
wherein said base station controller is in communication with said base stations and fixed subscriber stations and mobile stations;
wherein said licensed and unlicensed frequency bands are within a range below 1 GHz;
wherein said two-way communication operates in accordance with mobile wireless standard air interface standard (ieee802.16e-2005), which is modified for dedicated channel sizes below 1.25 MHz;
wherein the system is configured to operate over a very wide frequency range and channel bandwidths, thereby enabling the use of disparate frequency channels within the same network without limitation on the number of plurality of frequencies, and plurality of bands and bandwidths being used;
wherein the basic symbol rate (BSR) of each of said plurality of channel bandwidths is maximized; and
wherein duration of the OFDMA symbol (Tos) is determined in accordance with a formula, wherein: Tos in µs=NFFT*(1+CP)/BSR in Hz,
wherein NFFT=Total number of subcarriers including data transport subcarriers, guard subcarriers, pilots and DC subcarriers; BSR=Basic Symbol Rate; and
wherein a value of CP (Cyclic Prefix) comprises one of a group of values including ¼, ⅛, and ¹⁄₁₆, wherein the CP value is selected in accordance with a multipath performance required.

23. The system according to claim 22, configured to support a channel bandwidth that comprises a plurality of non adjacent 25 KHz bandwidth segments to deliver a 200 KHz channel or larger width.

24. The system according to claim 22, wherein a duration of the OFDMA frame ($T_{of}$) is determined in accordance with a formula:

$$T_{of}=(N_f*T_{os})+TTG+RTG$$

wherein:
Nf is a number of OFDMA symbols in one OFDMA frame;
RTG is a "Receive to Transmit" gap in a Base Station of a TDD System;
TTG is a "Transmit to Receive" gap in a Base Station of a TDD system;
wherein TTG>RTD+SSRTG, where RTD is a Round Trip Delay and SSRTG is a Receive to Transmit gap at the fixed Subscriber Stations or mobile stations; and
RTD=214 µs for 20 miles and SSRTG>50 µs.

25. The system according to claim 22, wherein the base stations and the fixed subscriber stations mobile stations are configured to support any of a group of non-standard channel sizes which are not specified in any of a group of standards including IEEE 802.16e-2005, 802.16e standard.

26. The system according to claim 25, wherein when the non-standard channel size is above or equal to 1.25 MHz and below 2.5 MHz, the frequency spacing of the non-standard channel size is configured to be scaled up relative to its sub carrier spacing in accordance with IEEE802.16e-2005 standard for the 128 FFT (Fast Fourier transform) configuration applicable for a 1.25 MHz wide channel.

27. The system according to claim 25, wherein when the non-standard channel size is above or equal 2.5 MHz and below or equal 5 MHz, the frequency spacing of the non-standard channel size is configured to be scaled down relative to the sub carrier spacing as defined in the IEEE802.16e-2005 standard for the 512 FFT configuration applicable for a 5 MHz wide channel.

28. The system according to claim 25, wherein when the non-standard channel size is above or equal 5 MHz and below or equal 6 MHz, the frequency spacing of the non-standard channel size is configured to be scaled up relative to the sub carrier spacing as defined in the IEEE802.16e-2005 standard for the 512 FFT configuration applicable for a 5 MHz wide channel.

29. A point to multipoint wireless Orthogonal Frequency Division Multiple Access (OFDMA) system comprising:
a Network Operating Center (NOC) comprising at least one of a group including a Base Station controller, a central router hub, an Authorization, Authentication, Accounting (AAA) server and a Network Management System (NMS) server;
a plurality of base stations, each of said base stations covering at least one sector; and
a plurality of mobile stations and fixed subscriber stations;
wherein each of said plurality of base stations maintains two-way data communication with said plurality of mobile stations and fixed subscriber stations in its serving area, concurrently, over licensed and unlicensed frequency bands;
wherein said base station controller is in communication with said base stations and fixed subscriber stations and mobile stations;
wherein said licensed and unlicensed frequency bands are within a range below 1 GHz;
wherein said two-way communication operates in accordance with mobile wireless standard air interface standard (ieee802.16e-2005), which is modified for dedicated channel sizes below 1.25 MHz;
wherein the Base Station (BS) and Mobile Station/Subscriber Station (MS/SS) Physical (PHY) Layers are configured to support non standard channel sizes of bandwidth less than 1.25 MHz by scaling down a number of sub-carriers while maintaining a constant sub-carrier frequency spacing; and
wherein the frequency spacing between the sub-carriers is configured in accordance with a plurality of criteria including speed requirements, distance and multipath conditions.

30. The system according with claim 29, wherein the non-standard channel sizes are divided into a number of sub channels which are orthogonal to each other,
wherein each subchannel comprises distinct sub-carriers which may be adjacent to each other or they may be interleaved with subcarriers of other sub-channels.

* * * * *